United States Patent
Enomoto

(10) Patent No.: US 6,519,093 B2
(45) Date of Patent: Feb. 11, 2003

(54) ZOOM LENS SYSTEM

(75) Inventor: Takashi Enomoto, Chiba (JP)

(73) Assignee: Pentax Corporation, Tokyo (JP)

( * ) Notice: Subject to any disclaimer, the term of this patent is extended or adjusted under 35 U.S.C. 154(b) by 39 days.

(21) Appl. No.: 09/882,069

(22) Filed: Jun. 18, 2001

(65) Prior Publication Data

US 2002/0015588 A1 Feb. 7, 2002

(30) Foreign Application Priority Data

Jun. 20, 2000 (JP) ........................................ 2000-184423

(51) Int. Cl.$^7$ ............................................... G02B 15/14
(52) U.S. Cl. ..................... 359/682; 359/689; 359/680
(58) Field of Search ................................. 359/680, 682, 359/686, 689

(56) References Cited

U.S. PATENT DOCUMENTS

| | | | |
|---|---|---|---|
| 4,984,877 A | 1/1991 | Ito ............................... | 359/692 |
| 5,270,866 A | 12/1993 | Oizumi et al. ............... | 359/689 |
| 5,455,714 A | 10/1995 | Kohno ......................... | 359/689 |
| 5,566,026 A | 10/1996 | Yoon ............................ | 359/689 |
| 5,574,599 A | 11/1996 | Hoshi et al. ................. | 359/689 |
| 5,793,533 A | 8/1998 | Yoneyama et al. .......... | 359/689 |
| 5,969,880 A | 10/1999 | Hasushita et al. ........... | 359/689 |
| 6,421,186 B2 * | 7/2002 | Enomoto ..................... | 359/682 |
| 6,456,442 B1 * | 9/2002 | Enomoto ..................... | 359/689 |
| 2002/0015588 A1 * | 2/2002 | Enomoto ..................... | 396/72 |

* cited by examiner

*Primary Examiner*—Georgia Epps
*Assistant Examiner*—David N. Spector
(74) *Attorney, Agent, or Firm*—Greenblum & Bernstein, P.L.C.

(57) ABSTRACT

A zoom lens system includes a negative first lens group, a positive second lens group, and a negative third lens group. Zooming is performed by moving the first through third lens groups along the optical axis, and the zoom lens system satisfies:

$$0.03 < (d_{W12} - d_{T12})/f_W < 0.1 \quad (1);$$

$$-4 < f_T/f_{1G} < -2 \quad (2);$$

wherein $d_{W12}$ and $d_{T12}$ designate the distance between the most image-side surface of the first lens group and the most object-side surface of the second lens group, at the short focal length extremity and long focal length extremity, respectively; $f_W$ and $f_T$ designate the focal length of the entire zoom lens system at the short focal length extremity and the long focal length extremity, respectively; and $f_{1G}$ designates the focal length of the negative first lens group.

5 Claims, 7 Drawing Sheets

Fig. 1
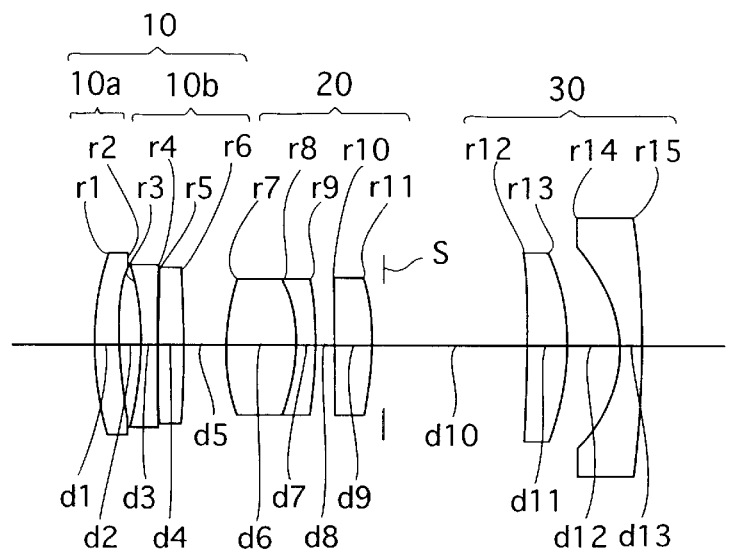
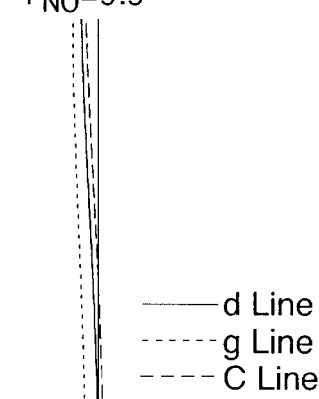
Fig.2A
$F_{NO}=5.3$
——— d Line
------- g Line
- - - - C Line
-1.0   1.0
SPHERICAL
ABERRATION
CHROMATIC
ABERRATION
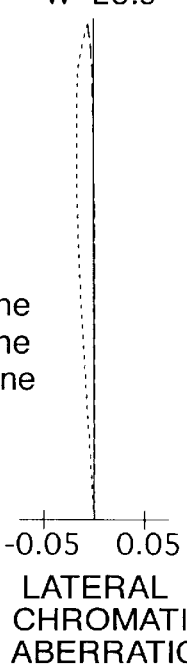
Fig.2B
W=28.3°
-0.05   0.05
LATERAL
CHROMATIC
ABERRATION
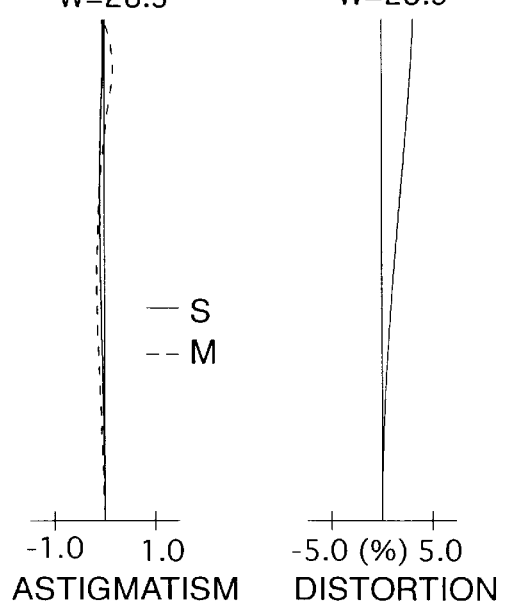
Fig.2C
W=28.3°
——— S
- - M
-1.0   1.0
ASTIGMATISM
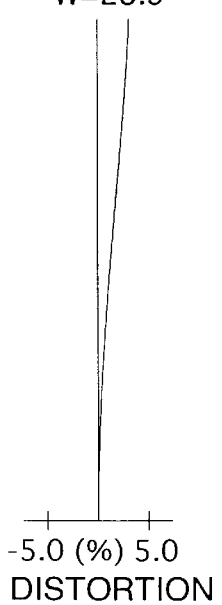
Fig.2D
W=28.3°
-5.0 (%) 5.0
DISTORTION

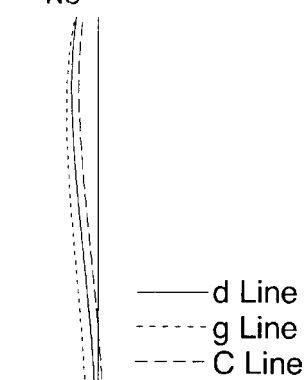
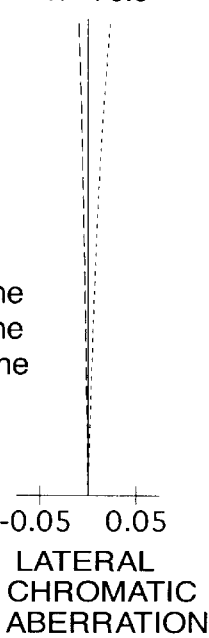
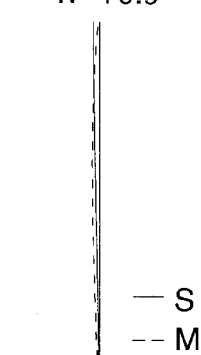
Fig.3A $F_{NO}=7.0$
— d Line
······ g Line
---- C Line
-1.0  1.0
SPHERICAL
ABERRATION
CHROMATIC
ABERRATION
Fig.3B $W=16.9°$
-0.05  0.05
LATERAL
CHROMATIC
ABERRATION
Fig.3C $W=16.9°$
— S
-- M
-1.0  1.0
ASTIGMATISM
Fig.3D $W=16.9°$
-5.0 (%) 5.0
DISTORTION
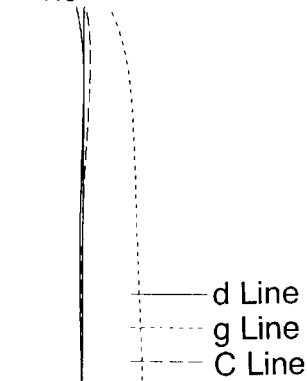
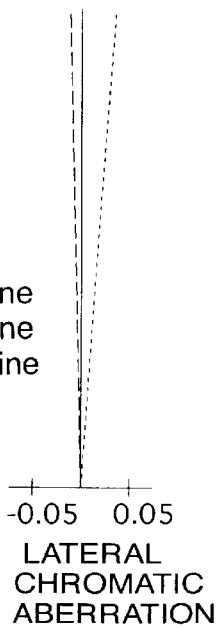
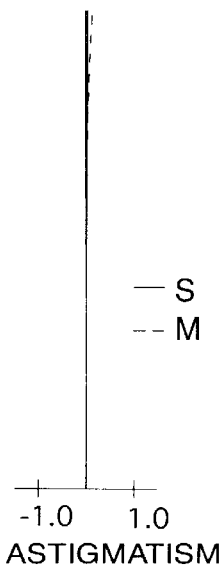
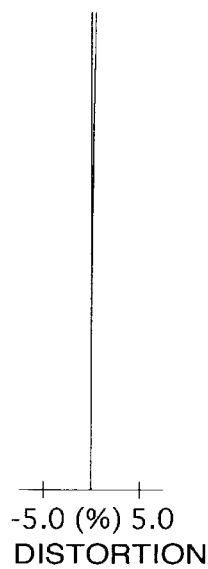
Fig.4A $F_{NO}=12.9$
— d Line
······ g Line
---- C Line
-1.0  1.0
SPHERICAL
ABERRATION
CHROMATIC
ABERRATION
Fig.4B $W=9.0°$
-0.05  0.05
LATERAL
CHROMATIC
ABERRATION
Fig.4C $W=9.0°$
— S
-- M
-1.0  1.0
ASTIGMATISM
Fig.4D $W=9.0°$
-5.0 (%) 5.0
DISTORTION

Fig. 5
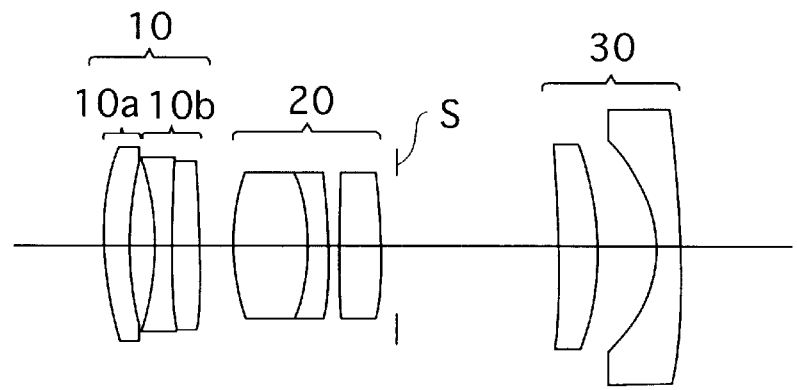
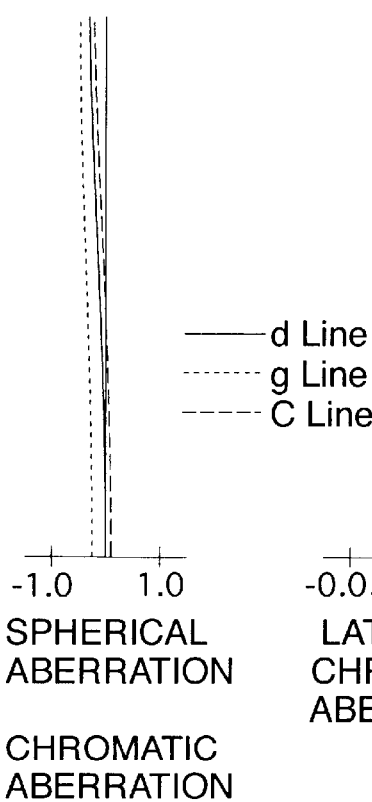
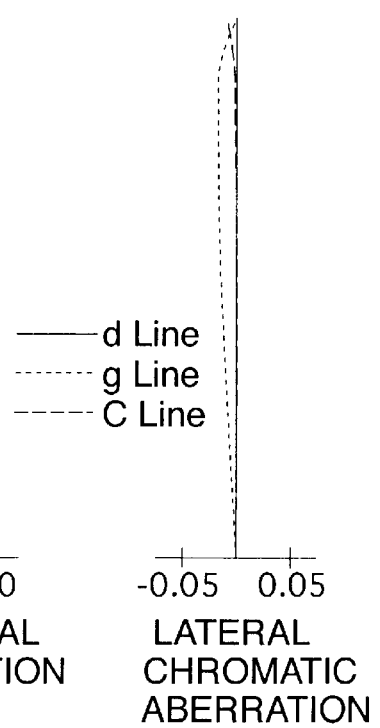
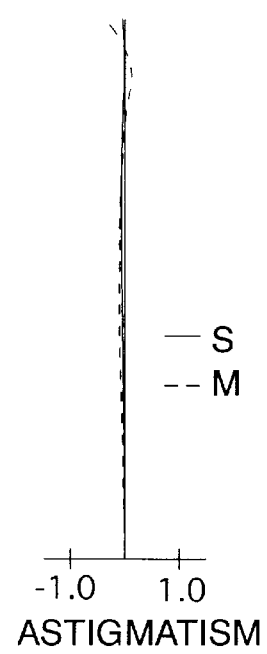
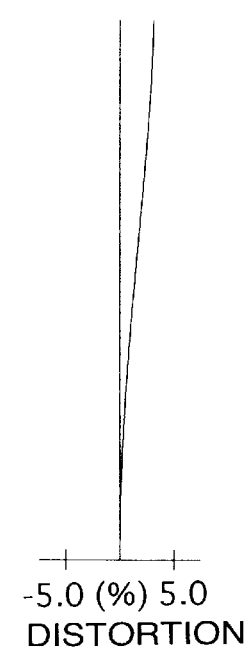
Fig.6A $F_{NO}=5.3$ — SPHERICAL ABERRATION CHROMATIC ABERRATION (d Line, g Line, C Line)
Fig.6B $W=28.3°$ — LATERAL CHROMATIC ABERRATION
Fig.6C $W=28.3°$ — ASTIGMATISM (S, M)
Fig.6D $W=28.3°$ — DISTORTION

Fig.7A
$F_{NO}=7.0$
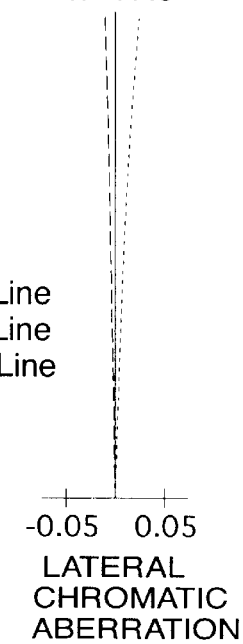
-1.0   1.0
SPHERICAL
ABERRATION
CHROMATIC
ABERRATION
— d Line
---- g Line
---- C Line
Fig.7B
W=17.0°
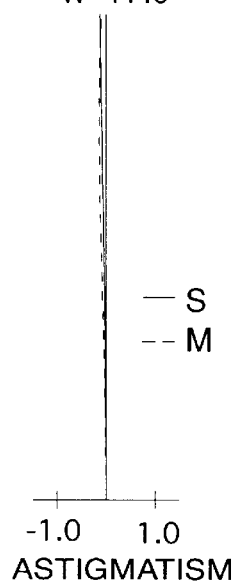
-0.05   0.05
LATERAL
CHROMATIC
ABERRATION
Fig.7C
W=17.0°
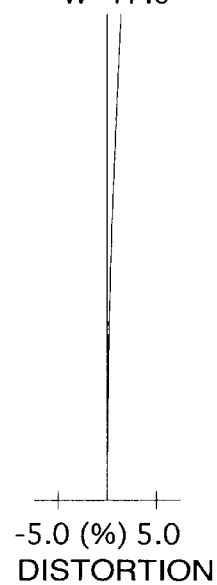
-1.0   1.0
ASTIGMATISM
— S
-- M
Fig.7D
W=17.0°
-5.0 (%) 5.0
DISTORTION
Fig.8A
$F_{NO}=12.9$
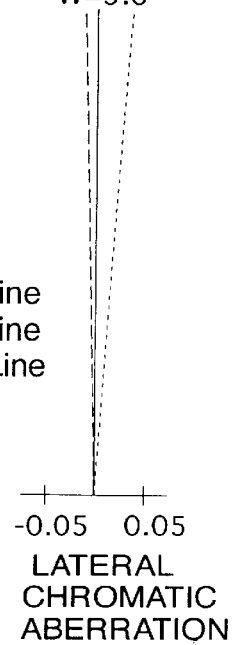
-1.0   1.0
SPHERICAL
ABERRATION
CHROMATIC
ABERRATION
— d Line
---- g Line
---- C Line
Fig.8B
W=9.0°
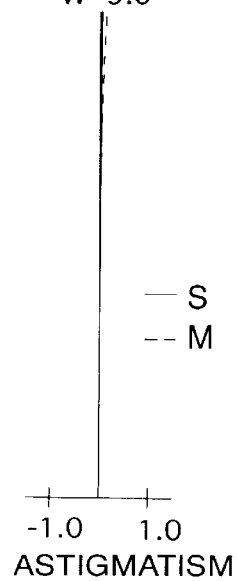
-0.05   0.05
LATERAL
CHROMATIC
ABERRATION
Fig.8C
W=9.0°
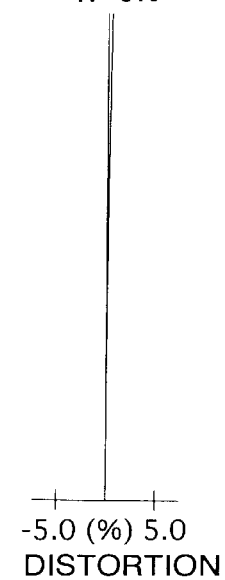
-1.0   1.0
ASTIGMATISM
— S
-- M
Fig.8D
W=9.0°
-5.0 (%) 5.0
DISTORTION

Fig. 9
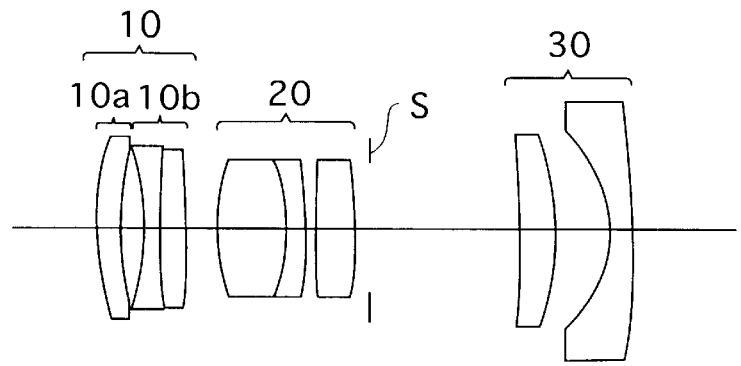
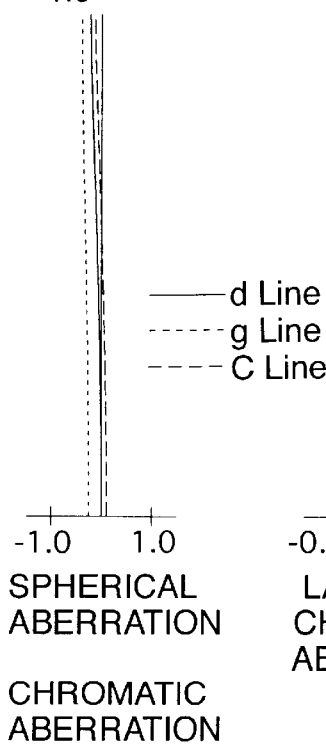
Fig.10A
F_NO=5.3
-1.0  1.0
SPHERICAL
ABERRATION
CHROMATIC
ABERRATION
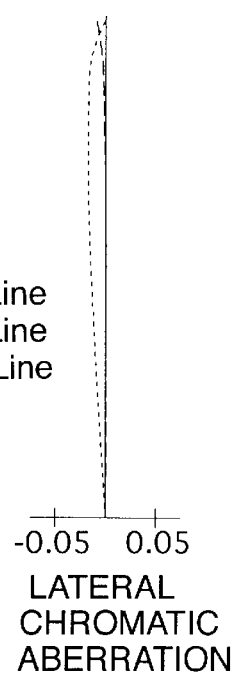
Fig.10B
W=28.3°
-0.05  0.05
LATERAL
CHROMATIC
ABERRATION
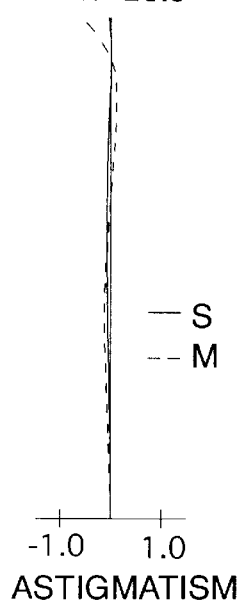
Fig.10C
W=28.3°
-1.0  1.0
ASTIGMATISM
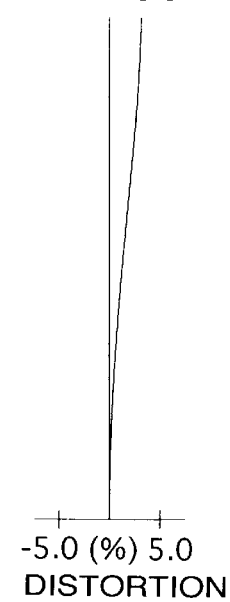
Fig.10D
W=28.3°
-5.0 (%) 5.0
DISTORTION

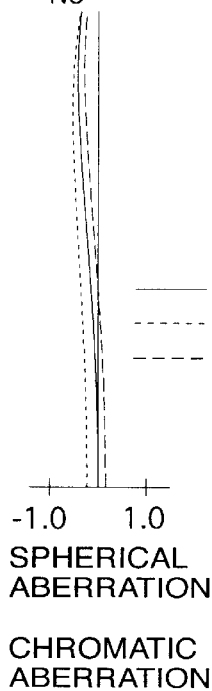
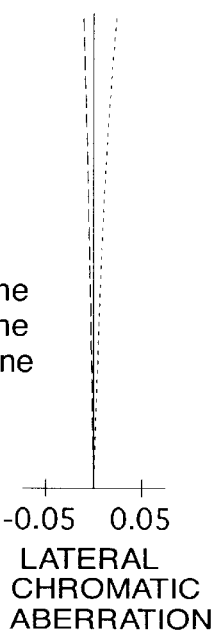
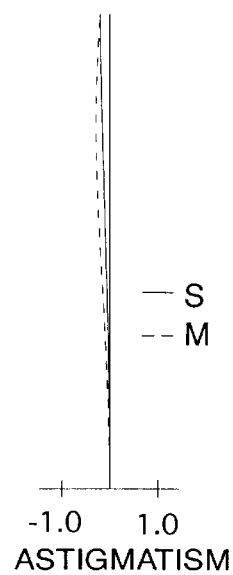
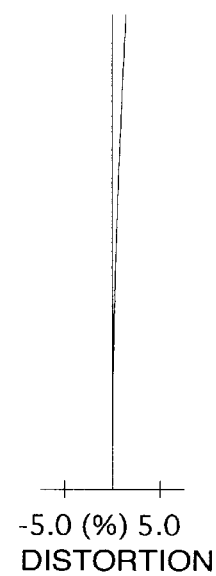
Fig.11A  Fig.11B  Fig.11C  Fig.11D
$F_{NO}=7.0$  W=17.0°  W=17.0°  W=17.0°
—— d Line
------ g Line
---- C Line
— S
-- M
-1.0  1.0
SPHERICAL ABERRATION
CHROMATIC ABERRATION
-0.05  0.05
LATERAL CHROMATIC ABERRATION
-1.0  1.0
ASTIGMATISM
-5.0 (%) 5.0
DISTORTION
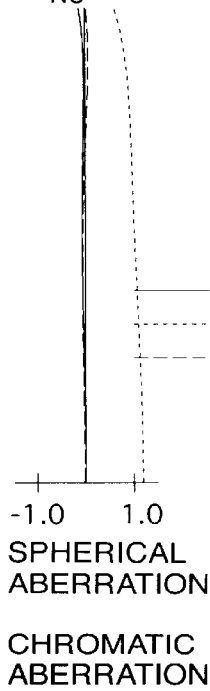
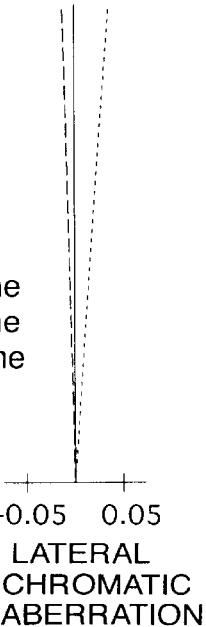
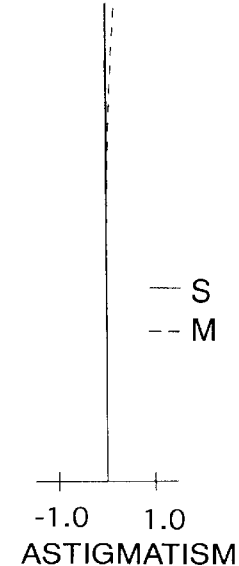
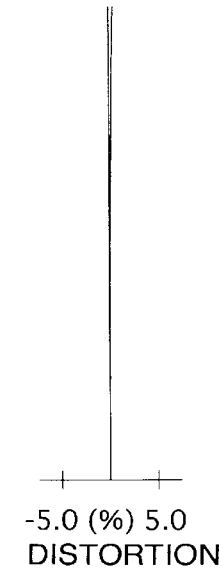
Fig.12A  Fig.12B  Fig.12C  Fig.12D
$F_{NO}=12.9$  W=9.0°  W=9.0°  W=9.0°
—— d Line
------ g Line
---- C Line
— S
-- M
-1.0  1.0
SPHERICAL ABERRATION
CHROMATIC ABERRATION
-0.05  0.05
LATERAL CHROMATIC ABERRATION
-1.0  1.0
ASTIGMATISM
-5.0 (%) 5.0
DISTORTION

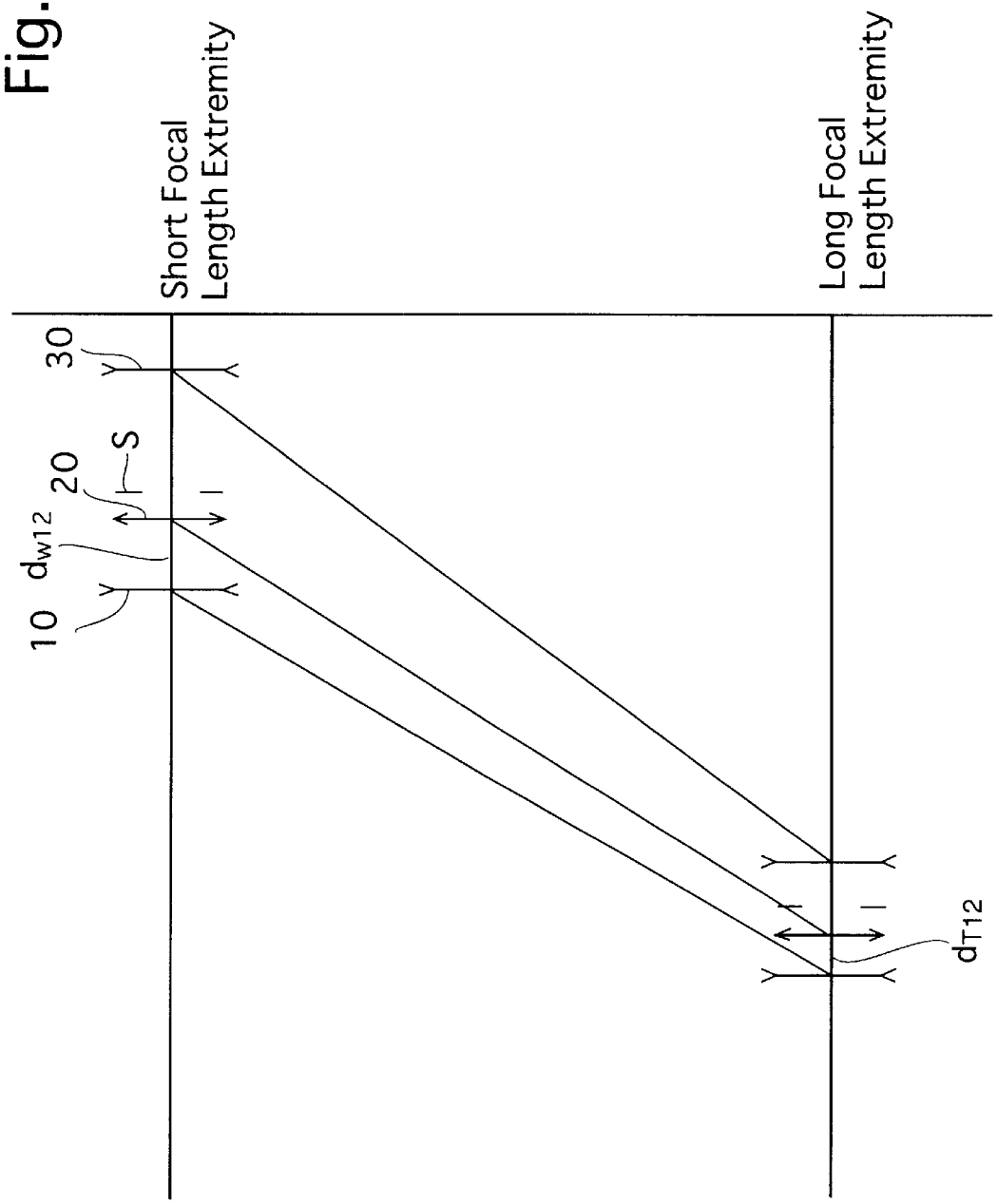

ZOOM LENS SYSTEM

BACKGROUND OF THE INVENTION

1. Field of the Invention

The present invention relates to a zoom lens system for a compact camera, and in particular, relates to achieving a higher zoom ratio and achieving miniaturization of a zoom lens system.

2. Description of the Related Art

In a zoom lens system for a compact camera, in addition to requirements for miniaturization, a zoom lens system with a higher zoom ratio of 3.0 or more has increasingly been required in these years. Unlike a zoom lens system for a single lens reflex (SLR) camera, a zoom lens system for a compact camera does not require a longer back focal distance behind the photographing lens system. Accordingly, in a compact camera, a telephoto type zoom lens system including a positive front lens group and a negative rear lens group has been employed, while in a SLR camera, a retro-focus zoom lens system including a negative front lens group and a positive rear lens group has been employed for the purpose of securing a back focal distance.

In such a zoom lens system of a compact camera, if a zoom ratio of about 3.5 is required, a three-lens-group zoom lens system including a negative lens group, a positive lens group and a negative lens group has been conventionally employed. In this three-lens-group zoom lens system, zooming is performed by varying the distance between the first lens group and the second lens group. More concretely, in the prior art, in order to achieve a higher zoom ratio, the first lens group and the second lens group are generally moved so that the distance therebetween increases in a direction toward the long focal length extremity from the short focal length extremity. However, along with the increase in distance between the first lens group and the second lens group, there is a need to increase the diameters of the first and second lens groups in order to collect peripheral illumination. As a result, the overall length of the zoom lens system and the diameters of the lens groups have to be increased, so that miniaturization of the zoom lens system cannot be attained.

SUMMARY OF THE INVENTION

It is an object of the present invention to provide a miniaturized three-lens-group telephoto zoom lens system with a zoom ratio of about 3.5.

In order to achieve the above-mentioned object, there is provided a zoom lens system including a negative first lens group, a positive second lens group, and a negative third lens group, in this order from the object. Zooming is performed by moving the first, second, and third lens groups along the optical axis, and the zoom lens system satisfies the following conditions:

$$0.03 < (d_{W12} - d_{T12})/f_W < 0.1 \quad (1)$$

$$-4 < f_T/f_{1G} < -2 \quad (2)$$

wherein
- $d_{W12}$ designates the distance between the most image-side surface of the first lens group and the most object-side surface of the second lens group, at the short focal length extremity;
- $d_{T12}$ designates the distance between the most image-side surface of the first lens group and the most object-side surface of the second lens group, at the long focal length extremity;
- $f_W$ designates the focal length of the entire zoom lens system at the short focal length extremity;
- $f_T$ designates the focal length of the entire zoom lens system at the long focal length extremity; and
- $f_{1G}$ designates the focal length of the negative first lens group.

The zoom lens system according to the present invention preferably satisfies the following condition:

$$1.0 < f_{12T}/f_{12W} < 1.2 \quad (3)$$

wherein
- $f_{12T}$ designates the combined focal length of the first lens group and the second lens group at the long focal length extremity; and
- $f_{12W}$ designates the combined focal length of the first lens group and the second lens group at the short focal length extremity.

Furthermore, the first lens group preferably includes a positive first sub-lens group and a negative second sub-lens group, in this order from the object, and the first sub-lens group satisfies the following condition:

$$-1 < f_{1G}/f_{1a} < 0 \quad (4)$$

wherein
- $f_{1a}$ designates the focal length of the first sub-lens group.

The positive second lens group can include a lens element in which at least one of the surfaces is made aspherical, and the aspherical surface preferably satisfies the following condition:

$$-800 < \Delta I_{ASP} < -300 \quad (5)$$

wherein
- $\Delta I_{ASP}$ designates the amount of change of the spherical aberration coefficient due to the aspherical surface under the condition that the focal length of the entire zoom lens system at the long focal length extremity is converted to 1.0.

The negative third lens group can include a lens element in which at least one of the surfaces is made aspherical, and the aspherical surface preferably satisfies the following condition:

$$0 < \Delta V_{ASP} < 0.4 \quad (6)$$

wherein
- $\Delta V_{ASP}$ designates the amount of change of the distortion coefficient due to the aspherical surface under the condition that the focal length of the entire zoom lens system at the short focal length extremity is converted to 1.0.

The present disclosure relates to subject matter contained in Japanese Patent Application No. 2000-184423 (filed on Jun. 20, 2000) which is expressly incorporated herein by reference in its entirety.

BRIEF DESCRIPTION OF THE DRAWINGS

The invention will be discussed below in detail with reference to the accompanying drawings, in which:

FIG. 1 shows a lens arrangement of the zoom lens system according to a first embodiment of the present invention;

FIGS. 2A, 2B, 2C and 2D show aberrations occurred in the lens arrangement shown in FIG. 1, at the short focal length extremity;

FIGS. 3A, 3B, 3C and 3D shows aberrations occurred in the lens arrangement shown in FIG. 1, at an intermediate focal length;

FIG. 4A, 4B, 4C and 4D shows aberrations occurred in the lens arrangement shown in FIG. 1, at the long focal length extremity;

FIG. 5 shows a lens arrangement of the zoom lens system according to a second embodiment of the present invention;

FIGS. 6A, 6B, 6C and 6D show aberrations occurred in the lens arrangement shown in FIG. 5, at the short focal length extremity;

FIGS. 7A, 7B, 7C and 7D shows aberrations occurred in the lens arrangement shown in FIG. 5, at an intermediate focal length;

FIG. 8A, 8B, 8C and 8D shows aberrations occurred in the lens arrangement shown in FIG. 5, at the long focal length extremity;

FIG. 9 shows a lens arrangement of the zoom lens system according to a third embodiment of the present invention;

FIGS. 10A, 10B, 10C and 10D show aberrations occurred in the lens arrangement shown in FIG. 9, at the short focal length extremity;

FIGS. 11A, 11B, 11C and 11D shows aberrations occurred in the lens arrangement shown in FIG. 9, at an intermediate focal length;

FIG. 12A, 12B, 12C and 12D shows aberrations occurred in the lens arrangement shown in FIG. 9, at the long focal length extremity;

FIG. 13 is a schematic view of the lens-group moving paths for the zoom lens system according to the present invention.

DESCRIPTION OF THE PREFERRED EMBODIMENTS

According to FIG. 13 showing the schematic view of the lens-group moving paths, the zoom lens system includes a negative first lens group 10, a positive second lens group 20, and a negative third lens group 30, in this order from the object. In the three-lens-group zoom lens system, when zooming from the short focal length extremity to the long focal length extremity is performed, the first lens group 10, the second lens group 20, and the third lens group 30 are independently moved toward the object, while the distances therebetween are decreased. The diaphragm S is provided between the second lens group 20 and the third lens group 30, and moves together with the second lens group 20 upon zooming.

Condition (1) specifies the amount of change in distance between the first lens group 10 and the second lens group 20, upon zooming from the short focal length extremity toward the long focal length extremity. By satisfying this condition, when the first lens group 10 and the second lens group 20 are moved upon zooming, the amount of change in distance therebetween is not made longer, so that a high zoom ratio for the entire zoom lens system and miniaturization thereof can be achieved. In other words, as being apparent from condition (1), according to the zoom lens system shown in FIG. 13, it is specifically understood that a high zoom ratio can be achieved, while the distance between the first lens group and the second lens group is rather reduced.

If $(d_{W12} - d_{T12})/f_W$ exceeds the upper limit of condition (1), the amount of change in distance between the first lens group 10 and the second lens group 20 increases, so that miniaturization of the zoom lens system cannot be achieved.

If $(d_{W12} - d_{T12})/f_W$ exceeds the lower limit of condition (1), the zooming effect of the first lens group 10 and the second lens group 20 becomes small, so that a zoom ratio cannot be made higher.

Condition (2) specifies the focal length of the negative first lens group 10. By satisfying this condition, the traveling distance of the first lens group 10 can be made shorter, so that miniaturization of the zoom lens system can be achieved.

If $f_T/f_{1G}$ exceeds the upper limit of condition (2), the traveling distance of the first lens group 10 becomes longer, so that miniaturization of the zoom lens system cannot be achieved.

If $f_T/f_{1G}$ exceeds the lower limit of condition (2), the optical power (hereinafter, power) of the first lens group 10 becomes too strong and aberrations occurred in the first lens group becomes larger, so that fluctuations of aberrations upon zooming become larger.

Condition (3) specifies the combined focal length of the first lens group 10 and the second lens group 20. By satisfying this condition, a zoom ratio can be made higher through the zooming operation by the first lens group 10 and the second lens group 20.

If $f_{12T}/f_{12W}$ exceeds the upper limit of condition (3), the amount of change in distance between the first lens group 10 and the second lens group 20 increases, so that miniaturization of the zoom lens system cannot be achieved.

If $f_{12T}/f_{12W}$ exceeds the lower limit of condition (3), the zooming effect of the first lens group 10 and the second lens group 20 becomes small, so that a zoom ratio cannot be made higher.

Condition (4) specifies the ratio of the focal lengths between the negative first lens group 10 and the positive first sub-lens group under the condition that the negative first lens group 10 includes the positive first sub-lens group and the negative second sub-lens group, in this order from the object. By satisfying this condition, aberrations occurred in the first lens group 10 can be reduced, and fluctuations of aberrations at focal length points in a range defined by the short focal length extremity and the long focal length extremity can be reduced.

If $f_{1G}/f_{1a}$ exceeds the upper limit of condition (4), the power of the first lens group 10 becomes weaker, so that the effect of zooming is made smaller.

If $f_{1G}/f_{1a}$ exceeds the lower limit of condition (4), aberrations occurred in the first lens group 10 become larger, so that fluctuations of aberrations at focal length points in a range defined by the short focal length extremity and the long focal length extremity become larger.

Condition (5) specifies the amount of change of the spherical aberration coefficient due to the aspherical surface under the condition that a lens element having at least one aspherical surface is provided in the positive second lens group. By satisfying this condition, the number of lens elements in the positive second lens group can be reduced, and in particular, spherical aberration at the long focal length extremity can be corrected.

If $\Delta I_{ASP}$ exceeds the upper limit of condition (5), the effect of the correcting of spherical aberration by the aspherical surface becomes smaller, so that sufficient correction cannot be achieved.

If $\Delta I_{ASP}$ exceeds the lower limit of condition (5), the amount of asphericity becomes larger, so that the manufacture of the lens element with the aspherical surface becomes difficult.

Condition (6) specifies the amount of change of the distortion coefficient due to the aspherical surface under the condition that that a lens element having at least one aspherical surface is provided in the negative third lens group. By satisfying this condition, the number of lens elements in the negative third lens group can be reduced, and in particular, distortion at the short focal length extremity can be corrected.

If $\Delta V_{ASP}$ exceeds the upper limit of condition (6), the amount of asphericity becomes larger, so that the manufacture of the lens element with the aspherical surface becomes difficult.

If $\Delta V_{ASP}$ exceeds the lower limit of condition (6), the effect of the correcting of distortion by the aspherical surface becomes smaller, so that sufficient correction cannot be achieved.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, Fno designates the F-number, f designates the focal length of the entire zoom lens system, W designates the half angle-of-view (°), fB designates the back focal distance, r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIGS. 1 through 4D show the first embodiment of the zoom lens system. FIG. 1 shows a lens arrangement of the zoom lens system. The first lens group 10 includes a positive first sub-lens group 10a constituted by a positive lens element, and a negative second sub-lens group 10b constituted by a negative lens element and a positive lens element, in this order from the object. The second lens group 20 includes cemented lens elements constituted by a positive lens element and a negative lens element, and a positive lens element, in this order from the object. The third lens group 30 includes a positive lens element and a negative lens element, in this order from the object. A diaphragm S is provided on the image-side of the second lens group 20, and is arranged to move together with the second lens group 20 upon zooming. FIGS. 2A through 2D show aberrations occurred in the lens arrangement, at the short focal length extremity. FIGS. 3A through 3D shows aberrations occurred in the lens arrangement, at an intermediate focal length. FIG. 4A through 4D shows aberrations occurred in the lens arrangement, at the long focal length extremity. Table 1 shows the numerical data of the first embodiment.

TABLE 1

$F_{NO} = 1:5.3–7.0–12.9$
$f = 39.00–70.00–136.00$ (Zoom Ratio:3.49)
$W = 28.3–16.9–9.0$
$f_B = 11.75–39.59–87.76$

| Surface No. | r | d | Nd | ν |
|---|---|---|---|---|
| 1 | 24.283 | 1.80 | 1.50000 | 67.9 |
| 2 | 25.900 | 1.64 | — | — |
| 3 | −22.836 | 1.40 | 1.74330 | 49.3 |
| 4 | 88.740 | 1.90 | 1.67912 | 30.7 |
| 5 | −88.740 | 3.30–1.80–0.25 | — | — |
| 6 | 17.123 | 5.30 | 1.48749 | 70.2 |
| 7 | −15.549 | 1.60 | 1.81506 | 27.9 |
| 8 | −39.222 | 1.33 | — | — |
| 9 | 125.886 | 3.00 | 1.73077 | 40.5 |
| 10* | −31.796 | 1.00 | — | — |
| 11 | ∞ | 11.28–4.60–2.09 | — | — |
| 12* | −43.251 | 2.80 | 1.58547 | 29.9 |
| 13 | −20.300 | 4.11 | — | — |
| 14 | −10.658 | 1.80 | 1.77500 | 49.3 |
| 15 | −77.246 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | $0.3449 \times 10^{-4}$ | $0.1130 \times 10^{-6}$ | $-0.3563 \times 10^{-10}$ |
| 11 | 0.00 | $0.4819 \times 10^{-4}$ | $0.1967 \times 10^{-6}$ | $0.2049 \times 10^{-8}$ |

[Embodiment 2]

FIGS. 5 through 8D show the second embodiment of the zoom lens system. FIGS. 6A through 6D show aberrations occurred in the lens arrangement, at the short focal length extremity. FIGS. 7A through 7D shows aberrations occurred in the lens arrangement, at an intermediate focal length. FIGS. 8A through 8D shows aberrations occurred in the lens arrangement, at the long focal length extremity. Table 2 shows the numerical data of the second embodiment. The basic lens arrangement of the second embodiment is the same as the first embodiment.

TABLE 2

$F_{NO} = 1:5.3–7.0–12.9$
$f = 39.00–70.00–136.00$ (Zoom Ratio:3.49)
$W = 28.3–17.0–9.0$
$f_B = 11.20–38.67–88.04$

| Surface No. | r | d | Nd | ν |
|---|---|---|---|---|
| 1 | 22.911 | 1.80 | 1.48749 | 70.2 |
| 2 | 25.431 | 1.68 | — | — |
| 3 | −22.195 | 1.40 | 1.74320 | 49.3 |
| 4 | 88.750 | 1.90 | 1.66836 | 31.4 |
| 5 | −88.750 | 2.70–1.50–0.25 | — | — |
| 6 | 17.067 | 5.30 | 1.48749 | 70.2 |

TABLE 2-continued $F_{NO}$ = 1:5.3–7.0–12.9
f = 39.00–70.00–136.00 (Zoom Ratio:3.49)
W = 28.3–17.0–9.0
$f_B$ = 11.20–38.67–88.04

| Surface No. | r | d | Nd | ν |
|---|---|---|---|---|
| 7 | −15.901 | 1.60 | 1.80894 | 27.6 |
| 8 | −38.361 | 1.09 | — | — |
| 9 | 166.171 | 3.00 | 1.73077 | 40.5 |
| 10* | −31.123 | 1.02 | — | — |
| 11 | ∞ | 11.64–4.83–1.98 | — | — |
| 12* | −47.686 | 2.80 | 1.58547 | 29.9 |
| 13 | −21.576 | 4.13 | — | — |
| 14 | −10.580 | 1.80 | 1.77250 | 49.6 |
| 15 | −70.382 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | $0.3631 \times 10^{-4}$ | $0.1661 \times 10^{-6}$ | $-0.6975 \times 10^{-9}$ |
| 11 | 0.00 | $0.5211 \times 10^{-4}$ | $0.3105 \times 10^{-6}$ | $0.1071 \times 10^{-8}$ |

[Embodiment 3]

FIGS. 9 through 12D show the third embodiment of the zoom lens system. FIGS. 10A through 10D show aberrations occurred in the lens arrangement, at the short focal length extremity. FIGS. 11A through 11D shows aberrations occurred in the lens arrangement, at an intermediate focal length. FIGS. 12A through 12D shows aberrations occurred in the lens arrangement, at the long focal length extremity. Table 3 shows the numerical data of the third embodiment. The basic lens arrangement of the third embodiment is the same as the first embodiment.

TABLE 3

$F_{NO}$ = 1:5.3–7.0–12.9
f = 39.00–70.00–136.00 (Zoom Ratio:3.49)
W = 28.3–17.1–9.0
$f_B$ = 11.29–38.71–88.23

| Surface No. | r | d | Nd | ν |
|---|---|---|---|---|
| 1 | 22.758 | 1.80 | 1.48749 | 70.2 |
| 2 | 24.535 | 1.75 | — | — |
| 3 | −21.200 | 1.40 | 1.74320 | 49.3 |
| 4 | 88.740 | 1.90 | 1.65854 | 32.0 |
| 5 | −88.740 | 2.35–1.30–0.25 | — | — |
| 6 | 15.803 | 5.30 | 1.48749 | 70.2 |
| 7 | −16.417 | 1.60 | 1.84499 | 27.3 |
| 8 | −36.656 | 0.87 | — | — |
| 9 | 209.496 | 3.00 | 1.73077 | 40.5 |
| 10* | −31.112 | 1.13 | — | — |
| 11 | ∞ | 11.52–4.69–1.86 | — | — |
| 12* | −59.612 | 2.80 | 1.58547 | 29.9 |
| 13 | −23.079 | 4.11 | — | — |
| 14 | −10.550 | 1.80 | 1.77250 | 49.6 |
| 15 | −75.146 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | $0.4888 \times 10^{-4}$ | $0.4783 \times 10^{-7}$ | $0.6643 \times 10^{-9}$ |
| 11 | 0.00 | $0.6189 \times 10^{-4}$ | $0.5551 \times 10^{-7}$ | $0.4212 \times 10^{-8}$ |

TABLE 4

|  | Embod.1 | Embod.2 | Embod.3 |
|---|---|---|---|
| Condition(1) | 0.08 | 0.06 | 0.05 |
| Condition(2) | −3.09 | −3.12 | −3.43 |
| Condition(3) | 1.100 | 1.082 | 1.080 |
| Condition(4) | −0.078 | −0.113 | −0.082 |
| Condition(5) | −484.91 | −520.90 | −721.16 |
| Condition(6) | 0.1788 | 0.2127 | 0.2476 |

As can be understood from Table 4, each embodiment satisfies each condition; and furthermore, as can be understood from the drawings, the various aberrations have been satisfactorily corrected.

According to the above description, a miniaturized three-lens-group telephoto zoom lens system with a zoom ratio of about 3.5 can be obtained.

What is claimed is:

1. A zoom lens system comprising a negative first lens group, a positive second lens group, and a negative third lens group, in this order from an object,
   wherein zooming is performed by moving said first, second, and third lens groups along the optical axis; and
   wherein said zoom lens system satisfies the following conditions:

$$0.03 < (d_{W12} - d_{T12})/f_W < 0.1$$

$$-4 < f_T/f_{1G} < 2$$

wherein
   $d_{W12}$ designates the distance between the most image-side surface of said first lens group and the most object-side surface of said second lens group, at the short focal length extremity;
   $d_{T12}$ designates the distance between the most image-side surface of said first lens group and the most object-side surface of said second lens group, at the long focal length extremity;
   $f_W$ designates the focal length of the entire zoom lens system at the short focal length extremity;
   $f_T$ designates the focal length of the entire zoom lens system at the long focal length extremity; and
   $f_{1G}$ designates the focal length of said negative first lens group.

2. The zoom lens system according to claim 1, wherein said zoom lens system satisfies the following condition:

$$1.0 < f_{12T}/f_{12W} < 1.2$$

wherein
   $f_{12T}$ designates the combined focal length of said first lens group and said second lens group at the long focal length extremity; and
   $f_{12W}$ designates the combined focal length of said first lens group and said second lens group at the short focal length extremity.

3. The zoom lens system according to claim 1, wherein said first lens group comprises a positive first sub-lens group and a negative second sub-lens group, in this order from said object, and wherein said first sub-lens group satisfies the following condition:

$$-1 < f_{1G}/f_{1a} < 0$$

wherein $f_{1a}$ designates the focal length of said first sub-lens group.

4. The zoom lens system according to claim 1, wherein said positive second lens group comprises a lens element in which at least one of the surfaces is made aspherical, and wherein said aspherical surface satisfies the following condition:

$$-800 < \Delta I_{ASP} < -300$$

wherein $\Delta I_{ASP}$ designates the amount of change of the spherical aberration coefficient due to said aspherical surface under the condition that the focal length of the entire zoom lens system at the long focal length extremity is converted to 1.0.

5. The zoom lens system according to claim 1, wherein said negative third lens group comprises a lens element in which at least one of the surfaces is made aspherical, and wherein said aspherical surface satisfies the following condition:

$$0 < \Delta V_{ASP} < 0.4$$

wherein $\Delta V_{ASP}$ designates the amount of change of the distortion coefficient due to the aspherical surface under the condition that the focal length of the entire zoom lens system at the short focal length extremity is converted to 1.0.

* * * * *